Nov. 29, 1938.   H. D. GEYER   2,138,697
EJECTING DEVICE FOR FREEZING TRAYS
Filed Nov. 29, 1935   2 Sheets-Sheet 1

INVENTOR
Harvey D. Geyer
BY
Spencer Hardman & Fehr
HIS ATTORNEYS

Nov. 29, 1938.       H. D. GEYER       2,138,697
EJECTING DEVICE FOR FREEZING TRAYS
Filed Nov. 29, 1935       2 Sheets-Sheet 2

INVENTOR
Harvey D. Geyer
BY
Spencer Hardman & Lehr
HIS ATTORNEYS

Patented Nov. 29, 1938

2,138,697

UNITED STATES PATENT OFFICE 2,138,697

EJECTING DEVICE FOR FREEZING TRAYS

Harvey D. Geyer, Dayton, Ohio, assignor to General Motors Corporation, Detroit, Mich., a corporation of Delaware Application November 29, 1935, Serial No. 52,173

11 Claims. (Cl. 62—108.5)

This invention relates to freezing trays of the type ordinarily used in mechanical refrigerators for freezing small blocks of ice or other liquid for home use.

An object of this invention is to provide an ice tray having simple and efficient means whereby the frozen ice blocks may be forcibly loosened from their frozen bond to the tray container and partitions to facilitate removal of the ice blocks, without first thawing the ice blocks free.

Further objects and advantages of the present invention will be apparent from the following description, reference being had to the accompanying drawings wherein a preferred embodiment of the present invention is clearly shown.

In the drawings.

Similar reference characters refer to similar parts throughout.

10 designates the tray pan which is here shown as made in one piece from relatively thin and slightly flexible sheet metal. The metal grid unit 11 has a longitudinal partition 12 and a series of transverse partitions 13 fixed thereto in any suitable manner to form a well-known separate removable grid for easy cleaning of the pan and grid. Preferably, but not necessarily, the cross partitions 13 are slightly tapered in section toward their top edges (see Fig. 2) in order to facilitate the hereinafter described method of removing the frozen ice blocks from the grid.

Figure 2:
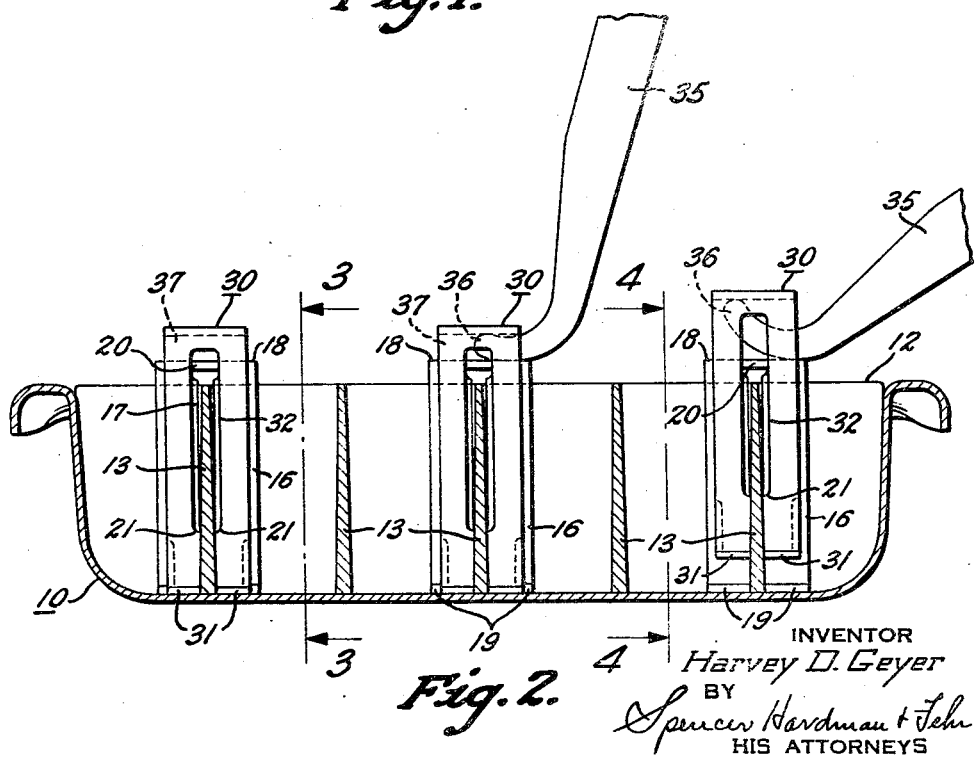
Fig. 2 is a section on line 2—2 of Fig. 1, but illustrates how the ice-ejecting units are actuated by a separate prying lever to loosen or remove the frozen ice blocks.

The ejecting units 15 of this invention each preferably has a small metal U-shaped bearing member 16 having a slot 17 therein which permits said bearing member 16 to be slipped loosely but with a neat fit down over an intersection of the grid partitions 12 and 13, the cross partition 13 falling neatly within the slot 17 as best shown in Fig. 2. The upper roll 18 of bearing member 16 overlies the top edge of the central partition 12 and provides the desired strong bearing support for the prying lever 35 later described. The down force on the bearing member 16 is carried by the four flanged ends 19 thereon which rest flat upon the bottom of tray pan 10 as clearly shown in Figs. 2, 3, 4.

Figure 3:
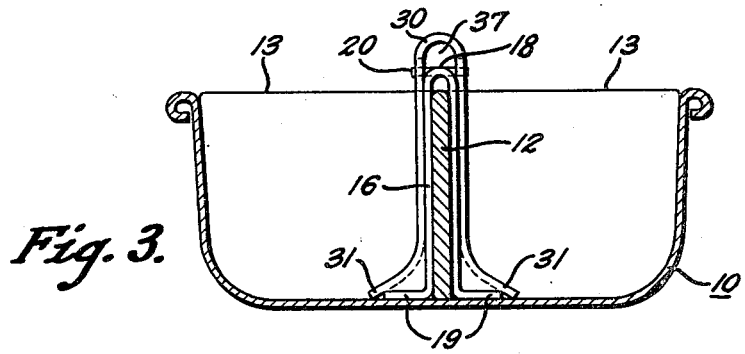
Fig. 3 is a section on line 3—3 of Fig. 2.
Figure 4:
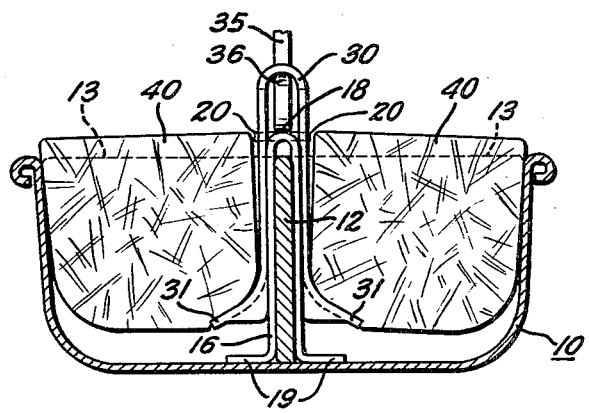
Fig. 4 is a section on line 4—4 of Fig. 2 and illustrates how the ice blocks are forced up by the ice-ejecting unit.
Figure 5:
Fig. 5 is a side view of the separate prying tool.
Figure 6:
Fig. 6 is an edge view of the separate prying tool.

The ice-ejecting member 30 is shaped similarly to bearing member 16 but is large enough to be telescoped with an easy sliding fit down over member 16 until its four laterally extended feet 31 rest either upon the bottom of pan 10 or upon the flanges 19 immediately adjacent thereto (see Fig. 3). Member 30 has a transverse slot 32 therein which receives the grid cross partition 13 as will be clear from the drawings. Preferably the lateral feet 31 of the ejecting member 30 are turned outwardly at an easy curved incline as shown, so that when said member 30 is forced upwardly by the prying tool 35 the ice blocks 40 will not be cracked or broken thereby but may easily free themselves from the feet 31 and roll or pivot slightly thereupon as illustrated in Fig. 4.

Figure 1:
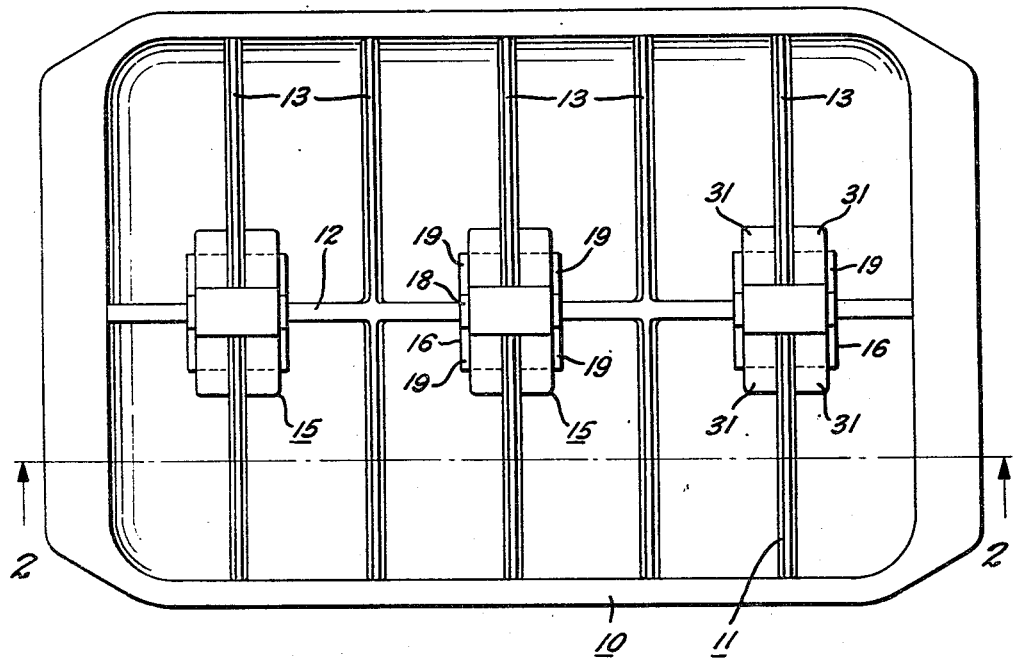
Fig. 1 is a plan view of an ice tray having three individual ice-ejecting units made according to this invention applied thereto in their position when the ice is frozen.

In operation, the ejecting units 15 are slipped over the intersecting grid partitions as shown in Fig. 1 either before or after the tray is filled with water to be frozen and remain in place during freezing. One ejecting unit 15 takes care of the four adjacent ice block compartments. After the ice is completely frozen the tray is removed, and the curved end 36 of the separate prying tool 35 is inserted in the open space 37 between the top of ejecting member 30 and bearing member 16 as shown at the center of Fig. 2. The outer end of tool 35 is then pressed down, which forces the ejecting member 30 upwardly with a greatly multiplied force as shown at the right in Fig. 2. This causes the four laterally projecting feet 31 to pull the four overlying ice blocks free from the pan 10 and partitions 12 and 13 and carry them up to a position when they may be easily picked out with the fingers or if desired the ice blocks may be raised entirely from the grid by the member 30. The bearing member 16 is preferably of steel and its bearing surface 18 is sufficiently hard to withstand the quite high bearing pressure caused by the relatively narrow bearing area of lever 35. Lever 35 should be sufficiently narrow to pass between two adjacent ice blocks while they are being ejected so as not to obstruct their up movement. Each operation of an ejecting unit 15 removes only four ice blocks at a time, hence the effort required is much less than if all the blocks in the tray had to be loosened at one operation.

A further advantage of this device lies in the fact that if only several ice blocks are needed at a certain time they can be quickly removed without disturbing the remaining ice, since the metal grid 11 remains stationary in the pan 10, except that it is normally pulled upwardly by the ice bond until the top edge of partition 12 strikes portion 18 of stationary bearing member 16.

Figure 7:
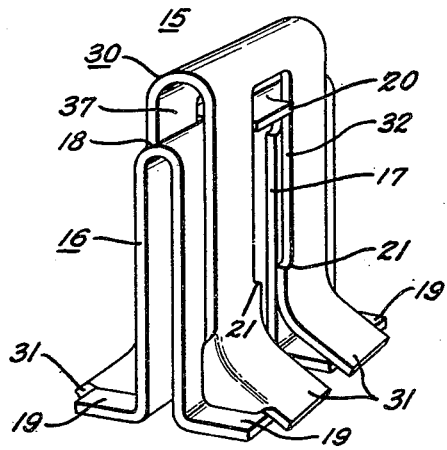
Fig. 7 is a perspective view of one ice-ejecting unit detached from the ice tray and partitions thereof.

A detail of the device, which may be used or not as desired, is the means for preventing ejecting member 30 from becoming entirely separated from bearing member 16. For this purpose two legs 20 are provided on member 16 which project into and slide within the two slots 32 in member 30. The lower portion of slots 32 is of reduced width forming shoulders 21 which will abut the legs 20 and so limit the relative sliding movement between members 16 and 30. Hence these two members when once assembled together into the unit shown in Fig. 7 cannot become separated and can thus be more quickly inserted in place in the tray. An important feature of the ejecting device above described is their capability of being employed with ice trays having an ordinary grid construction such as are now in general use rather than to make it necessary to scrap such trays and provide new trays of special design. Hence these ejecting devices may be made and sold as accessories for ice trays and grids now in use.

It will be obvious from the above description that, if the central partition 12 of the grid 11 be made of sufficient strength and hardness to withstand the bearing pressure and wear when serving as a fulcrum for the prying tool 35, the bearing member 16 may be dispensed with entirely in which case the ejecting member 30 will be made to fit and slide directly upon the grid partition 12 rather than upon member 16. In the form illustrated, member 16 serves as a bearing member for tool 35 and transmits the down force of tool 35 to the bottom of pan 10 thru the enlarged areas of its angular feet 19.

While the embodiment of the present invention as herein disclosed, constitutes a preferred form, it is to be understood that other forms might be adopted, all coming within the scope of the claims which follow.

What is claimed is as follows:

1. In combination, a freezing tray having a partition therein for dividing the frozen contents into blocks, a reciprocatable ice-ejecting member slidably mounted upon and straddling said partition wall and having a portion overlying and spaced from the top of said partition wall and laterally extending feet which substantially underlie the ice blocks frozen in place on both sides of said partition, and a separate prying tool insertable between the top of said partition and the overlying portion of said ejecting member for forcing said ejecting member upwardly.

2. In combination, a freezing tray having two intersecting partitions therein for dividing the frozen contents into blocks, an ice-ejecting member slidably mounted upon said partitions at their intersection, said member having a portion extending down into each of the four adjacent ice block compartments, each of said portions having a lateral foot therein partially underlying the ice block frozen in its compartment, and force-multiplying means for raising said ejecting member and thereby causing said feet to loosen and raise their overlying ice blocks.

3. In combination, a freezing tray having two intersecting partitions therein for dividing the frozen contents into blocks, an ice-ejecting member slidably mounted upon said partitions at their intersection, said member having a portion extending down into each of the four adjacent ice block compartments, each of said portions having a lateral foot therein partially underlying the ice block frozen in its compartment, and a prying tool for raising said ejecting member together with the ice blocks overlying its lateral feet.

4. In combination, a freezing tray having two intersecting partitions therein for dividing the frozen contents into blocks, a detachable U-shaped ice-ejecting member slidably mounted upon said partitions at their intersection, said member having four depending legs, one leg extending down into each of the four adjacent ice block compartments and having a lateral foot thereon underlying the ice block in its compartment, and force multiplying means for raising said ejecting member and thereby causing said feet to loosen and raise their overlying ice blocks.

5. In combination, a freezing tray having a partition therein for dividing the frozen contents into blocks, an inverted U-shaped bearing member straddling said partition and spaced from its upper edge and bearing upon the bottom of said tray, an ice-ejecting member vertically slidably mounted adjacent said bearing member and having lifting projections thereon which engage the frozen ice, and force-multiplying means reacting upon said bearing member for raising said ejecting member and its engaged ice relative to said tray and relative to said bearing member.

6. In combination, a freezing pan having a movable grid therein for dividing the frozen contents into blocks, an inverted U-shaped bearing member bearing upon the bottom portion of said pan and straddling a portion of said grid but permitting a limited upward movement of said grid relative to said pan, an ice-ejecting member vertically slidably mounted adjacent said bearing member and having lifting projections thereon which engage the frozen ice, and force-multiplying means reacting upon said bearing member for forcing said ejecting member and its engaged ice upwardly.

7. In a freezing tray, a container pan having an elongated partitioning grid fitting loosely therein and serving to divide the frozen contents into two rows each having four or more ice blocks, and a series of ice ejecting means disposed along the extent of said grid, each of said ejecting means being separately actuatable to loosen not more than four ice blocks from said grid at a time and leaving the remaining ice blocks bonded to said grid.

8. In a freezing tray, a container pan having an elongated partitioning grid fitting loosely therein and serving to divide the frozen contents into two rows each having four or more ice blocks, and a series of ice-ejecting means disposed along the extent of said grid, each of said ejecting means being individually actuatable and serving to loosen only several ice blocks from said grid at a time and leaving the remaining ice blocks bonded to said grid.

9. In a freezing tray, a container pan having an elongated partitioning grid fitting loosely therein and serving to divide the frozen contents into two rows each having four or more ice blocks, and force-multiplying mechanical ejecting means manually actuatable so as to loosen only a portion of said ice blocks as a group from said grid at a time, whereby the required force to actuate the ejecting mechanism is reduced.

10. A freezing tray comprising a container pan and an elongated grid serving to divide the frozen contents into two rows each having four or more ice blocks, and force-multiplying mechanical means associated with said grid and manually actuatable at separate and independent operations thereof to loosen relatively small groups of ice blocks from said grid, whereby the required force to actuate the ejecting mechanism is reduced.

11. In combination, a freezing tray having a movable partition therein for dividing the frozen contents into blocks, an ice-ejecting member mounted upon and straddling said partition wall and having lateral extensions which substantially underlie the ice blocks frozen in place on both sides of said partition, and a separate detachable prying tool actuatable to hold said movable partition wall down and raise said ejecting member together with the ice blocks overlying said lateral extensions.

HARVEY D. GEYER.